United States Patent [19]

Umetsu et al.

[11] Patent Number: 4,824,494

[45] Date of Patent: Apr. 25, 1989

[54] ALUMINUM-BASED ALLOY FOIL FOR NEGATIVE ELECTRODES OF ELECTROLYTIC CAPACITORS

[75] Inventors: Shozo Umetsu; Takeshi Nishizaki, both of Kawachinaganoshi, Japan

[73] Assignee: Showa Aluminum Kabushiki Kaisha, Osaka, Japan

[21] Appl. No.: 154,580

[22] Filed: Feb. 10, 1988

[30] Foreign Application Priority Data

Feb. 19, 1987 [JP] Japan ................................. 62-37575

[51] Int. Cl.⁴ .......................................... C22C 21/00
[52] U.S. Cl. .................................. 148/438; 420/538; 428/606

[58] Field of Search ................ 428/606; 420/538, 551, 420/552; 148/438

[56] References Cited

U.S. PATENT DOCUMENTS 4,164,434  8/1979  Fister, Jr. et al. ................... 420/552

Primary Examiner—R. Dean

[57] ABSTRACT

An aluminum-based alloy foil for use as negative electrodes of elecrolytic capacitors, the foil containing 0.1 to 1.0% of Cu, 0.01 to 1.0% of Ni, 0.002 to 0.05% of Ti, and optionally 0.0005 to 0.02% of B, wherein the balance is substantially aluminum.

4 Claims, No Drawings

ALUMINUM-BASED ALLOY FOIL FOR NEGATIVE ELECTRODES OF ELECTROLYTIC CAPACITORS

BACKGROUND OF THE INVENTION

1. Field of the Invention

The present invention relates to an aluminum-based alloy foil for use as negative electrodes of electrolytic capacitors. More particularly, the present invention relates to an aluminum-based alloy foil for such use, the foil having a high capacitance, and an increased mechanical strength, and being safe from cracks which otherwise would occur during the forging process. Hereinafter the electrolytic capacitor will be referred to merely as capacitor. The percentage is represented by weight unless specified to the contrary.

2. Description of the Prior Art

In order to minimize the size of capacitors without trading off their ability it is essential to increase the capacitances of not only anode foils but also negative electrode foils, hereinafter the negative electrode will be referred to merely as electrode. Conventionally the electrode foils are elecrochemically or chemically etched so as to increase the surface area thereof, thereby enhancing the capacitance per unit volume. In addition the compact capacitors requires a thin foil. However a thin foil is fragile, so that it must be strong enough to withstand any external stress.

To meet such demands in the industry the inventors have provided an improved aluminum-based alloy electrode foil, which is disclosed in Japanese Patent Publication (examined) No. 60(1985)-35815. According to the prior invention the alloy contains 0.01 to 1.0% of Ni, 0.1 to 1.0% of Cu, the balance being substantially aluminum.

The prior invention has increased the capacitance and mechanical strength of the foils. However a disadvantage is that cracks are likely to occur during the forging process of a slab.

OBJECTS AND SUMMARY OF THE INVENTION

The present invention aims at solving the problems pointed out with respect to the known aluminum-based alloy foils for capacitor electrodes, and has for its object to provide an improved aluminum-based alloy foils having an enhanced capacitance and mechanical strength, and being safe from cracks which otherwise would be likely to occur when they are produced from slabs.

Another object of the present invention is to provide an improved aluminum-based alloy foils for capacitor electrodes, thereby leading to a compact, ligtweight but highly efficient capacitor.

Other objects and advantages of the present invention will become more apparent from the following detailed description, when taken in conjunction with the example which shows one embodiment in accordance with the present invention.

According to the present invention there is provided an aluminum-based alloy foils for use as capacitor electrodes, the foil containing 0.1 to 1.0% of Cu, 0.01 to 1.0% of Ni, and 0.002 to 0.05% of Ti, wherein the balance is substantially aluminum.

DETAILED DESCRIPTION OF THE PREFERRED EMBODIMENT

When Cu and Ni are contained in aluminum-based alloy foil for capacitor electrodes they are effective to increase the capacitance thereof after they are etched. However if the content of Cu is less than 0.1%, and that of Ni is less than 0.01% such favorable effects will not result. If each content thereof exceeds 1.0% a rough etching structure will result, thereby leading to a decreased capacitance. In addition, the etching proceeds too much only to decrease the surface area, thereby decreasing the capacitance of the foil. The optimum ranges are 0.2 to 0.5% for Cu, and 0.05 to 0.3% for Ni.

The reason why Cu and Ni contained in aluminum increase the capacitance of the foils is as follows:

As is well known the capacitance of the foil increases with the increasing surface area. To this end the surface of the foil is etched to produce a fine unevenness thereon, thereby resulting in the increased surface area. If 0.01% or more of Ni is contained in aluminum, the structure will have fine crystals of $NiAl_3$ present in the aluminum matrix. This compound is potentially "noble", so that there will be a large potential difference between the aluminum matrix and the compound. Consequently the aluminum matrix is the first to become etched, thereby leading to the uneven surface. As is well known Cu is potentially "noble", and has a wider solid soluble range than Al. If more than 0.1% of Cu is contained in aluminum the aluminum matrix will be the first to become etched, and simultaneously the Ni content will have a lowered low limit for solid solubility. As a result a greater amount of $NiAl_3$ crystals will be separated. If will be appreciated from the foregoing description that when the aluminum-based alloy foil contains Cu and Ni the etched foil will have more finely divided particles on the surface than that containing none of them. However if each content exceeds 1.0% the etching will proceed too much only to produce large cavities on the surface. This fails to ncrease the surface area, thereby decreasing the capacitance of the foil.

Titanium is effective to prevent the slab from cracking when the foil is produced therefrom, and also effective to increase the mechanical strength of the foil because of the finely divided crystals. In addition, the presence of Ti enhances the capacitance. However if its content is less than 0.002% no such favorable effects will result. If it exceeds 0.05%, the etching will proceed too much, thereby leading to the decreased capacitance. The optimum range is 0.005 to 0.02%.

Boron, which can be optionally added, is also effective to prevent the slab from cracking when the foil is produced therefrom, and to increase the mechanical strength and the capacitance of the foil. However if its content is less than 0.0005% no such favorable effects will result. Whereas, if it exceeds 0.02% the etching will proceed too much, thereby reducing the capacitance of the foil. The optimum range is 0.001 to 0.01%.

It is possible that Fe, Mn, Zr, Mg and Cr are added to increase the mechanical strength of the foil in a range of not greater than 0.1%.

The foil of the present invention can be produced from a slab, which is made by forging (commonly called the half-successive forging process), and rolled in a known manner. Or else the foil can be directly made from a molten alloy (commonly called the full successive forging process). The slab can be of a hard quality or a soft quality.

The present invention will be better understood from the example below:

EXAMPLE

TABLE 1

| Used Alloys NO. | COMPOSITION (weight %) | | | | |
|---|---|---|---|---|---|
| | Cu | Ni | Ti | B | Al |
| 1 | 0.2 | 0.03 | 0.01 | — | Bal. |
| 2 | 0.3 | 0.2 | 0.02 | 0.01 | Bal. |
| 3 | 0.4 | 0.3 | 0.02 | 0.01 | Bal. |
| 4 | 0.6 | 0.5 | 0.03 | 0.02 | Bal. |
| 5 | 0.8 | 0.7 | 0.003 | 0.001 | Bal. |
| 6 | 0.05 | 0.005 | 0.01 | — | Bal. |
| 7 | 0.3 | 0.4 | — | — | Bal. |

(Note)
The alloys No. 1 to 5 contain the elements in the ranges specified by the invention. The alloys No. 6 and 7 contains elements out of the range specified by the invention. Bal. stands for balance.

Slabs of each alloy were forged, and any crack was observed. Then each slab was rolled in a known manner to obtain a foil having a thickness of 50 μm. The tensile strength of each foil was tested. Each foil was then submerged in a solution containing 3.0% hydrochloric acid and 0.5% oxalic acid heated to 60° C., and was etched with a current density of 30 A/dm$^2$ a.c. for a minute and a half. The capacitance of each foil was measured. The results are shown in Table 2:

TABLE 2

| Test Piece No. | Cracks | Tensile strength (kg/mm$^2$) | Capacitance (μF/cm$^2$) |
|---|---|---|---|
| 1 | nil | 25.4 | 245 |
| 2 | nil | 26.3 | 280 |
| 3 | nil | 28.5 | 275 |
| 4 | nil | 29.0 | 240 |
| 5 | nil | 30.5 | 230 |
| 6 | nil | 20.0 | 170 |
| 7 | some | 26.0 | 270 |

As evident from Table 2 the foils of the present invention have an increased mechanical strength and capacitance. In addition the foils are safe from any cracks which otherwise would be likely to occur during the forging process.

What is claimed is:

1. An aluminum-based alloy foil for use as negative electrodes of electrolytic capacitors, the foil consisting essentially of 0.2 to 0.5% of Cu, 0.01 to 0.3% of Ni, and 0.005 to 0.02% of Ti, wherein the balance is substantially aluminum.

2. An aluminum-based alloy foil according to claim 1, wherein the foil contains not smaller than 0.05% of Ni.

3. An aluminum-based alloy foil for use as negative electrodes of electrolytic capacitors, the foil consisting essentially of 0.2 to 0.5% of Cu, 0.01 to 0.3% of Ni, and 0.005 to 0.02% of Ti, and 0.001 to 0.01% of B, the balance being substantially aluminum.

4. An aluminum-based alloy foil according to the claim 3, wherein the foil contains not smaller than 0.05% of Ni.

* * * * *